(12) United States Patent
Koizumi et al.

(10) Patent No.: US 7,498,527 B2
(45) Date of Patent: Mar. 3, 2009

(54) COMPOUND OPERATION INPUT DEVICE (75) Inventors: Hirofumi Koizumi, Yao (JP); Satoshi Yamanaka, Yao (JP)

(73) Assignee: Hosiden Corporation, Yao-shi (JP)

( * ) Notice: Subject to any disclaimer, the term of this patent is extended or adjusted under 35 U.S.C. 154(b) by 0 days.

(21) Appl. No.: 11/806,726

(22) Filed: Jun. 4, 2007

(65) Prior Publication Data
US 2008/0041709 A1 Feb. 21, 2008

(30) Foreign Application Priority Data
Jun. 26, 2006 (JP) ............................. 2006-175671

(51) Int. Cl.
*H01H 25/04* (2006.01)
(52) U.S. Cl. ........................ 200/5 R; 200/4; 200/6 A
(58) Field of Classification Search .............. 200/4, 200/5 R, 6 A, 17 R, 18; 341/35; 345/156, 345/157, 161, 184
See application file for complete search history.

(56) References Cited

U.S. PATENT DOCUMENTS

| | | | | |
|---|---|---|---|---|
| 6,396,006 | B1 * | 5/2002 | Yokoji et al. | 200/4 |
| 6,784,384 | B2 * | 8/2004 | Park et al. | 200/11 R |
| 7,087,848 | B1 * | 8/2006 | Yamasaki et al. | 200/6 A |
| 7,119,290 | B2 * | 10/2006 | Kim | 200/5 R |
| 7,288,732 | B2 * | 10/2007 | Hashida | 200/5 A |
| 7,297,883 | B2 * | 11/2007 | Rochon et al. | 200/5 R |
| 7,312,411 | B2 * | 12/2007 | Osada et al. | 200/6 A |
| 7,342,187 | B2 * | 3/2008 | Yamaguchi | 200/14 |
| 7,405,728 | B2 * | 7/2008 | Arakawa et al. | 345/184 |
| 2002/0166754 | A1 | 11/2002 | Ohba et al. | 200/4 |

FOREIGN PATENT DOCUMENTS

| | | |
|---|---|---|
| EP | 0 587 406 A2 | 3/1994 |
| JP | 56-114230 | 9/1981 |
| JP | 6-178371 | 6/1994 |
| JP | 2001-325859 | 11/2001 |
| JP | 2001-351474 | 12/2001 |

(Continued)

OTHER PUBLICATIONS

Partial European Search Report of Sep. 25, 2007 for counterpart European Appln. No. 0725259.4; and Extended European Search Report of Jul. 14, 2008.

(Continued)

*Primary Examiner*—Michael A Friedhofer
(74) *Attorney, Agent, or Firm*—Kratz, Quintos & Hanson, LLP (57) ABSTRACT

The compound operation input device of the invention includes a case; a flexible substrate mounted on a bottom plate section of the case a first operation body moving operable in a direction orthogonal to the flexible substrate a second operation body tilting operable and rotating operable, the second operation body being an annular member arranged at the periphery of the first operation body; a first switching means operated by the movement of the first operation body; a plurality of second switching means operated by the tilt of the second operation body; and a rotary switch that detects the rotating direction and the rotating amount of the second operation body. The first and second switching means and the slid contacting point pattern of the rotary switch are arranged on the same surface of the flexible substrate.

10 Claims, 8 Drawing Sheets

FOREIGN PATENT DOCUMENTS

| | | |
|---|---|---|
| JP | 2002-093278 | 3/2002 |
| JP | 2003-93283 | 3/2002 |
| JP | 2003-115233 | 4/2003 |
| JP | 2003-296006 | 10/2003 |
| JP | 2003-346609 | 12/2003 |
| JP | 2006-073311 | 3/2006 |
| JP | 2006-73311 | 3/2006 |

OTHER PUBLICATIONS

Notification of Reasons for Refusal dated Sep. 30, 2008 for the counterpart Japanese application No. 2006-175671 (English translation not attached).

* cited by examiner

COMPOUND OPERATION INPUT DEVICE

The present application claims priority under 35 U.S.C. §119 of Japanese Patent Application No. 2006-175671 filed on Jun. 26, 2006, the disclosure of which is expressly incorporated by reference herein in its entity.

BACKGROUND OF THE INVENTION

1. Field of the Invention

The present invention relates to a compound operation input device capable of pressing operation input in a perpendicular direction, tilting operation input, and rotating operation input.

2. Description of the Related Art

A known compound operation input device includes a first operation body moving operable in the perpendicular direction; a second operation body tilting operable and rotating operable in the peripheral direction, the second operation body being an annular member arranged at the periphery of the first operation body; a first switching means operated by the movement of the first operation body; a plurality of second switching means operated by the tilt of the second operation body; a rotary switch that detects the rotating direction and the rotating amount of the second operation body; a first substrate arranged with the first and second switching means; and a second substrate formed with a slide contacting point pattern of the rotary switch (see Japanese Laid-Open Patent Publication No. 2001-325859).

Another known compound operation input device uses a magnetic sensor including an annular magnet attached to the second operation body, in which the N pole and the S pole are alternately arranged, and a magnetic field detection element for detecting the change in magnetic flux of the magnet in place of the rotary switch (see Japanese Laid-Open Patent Publication No. 2005-73311).

SUMMARY OF THE INVENTION

In the former device, however, the first and second switching means are arranged on the inner bottom surface (the first substrate) of the case, and the slide contacting point pattern of the rotary switch is formed on the substrate (the second substrate) accommodated in the case. That is, the former document has an essential drawback in that the height of the device becomes high since the first and second switching means as well as the rotary switch are arranged at different height positions. The former device has another drawback in that the installation of the substrate is very difficult since the substrate must be installed on the inner bottom surface without touching the first and second switching means on the inner bottom surface of the case.

In the latter device, although the first and second switching means as well as the magnetic field detecting element of the magnetic sensor are arranged on the same surface of the substrate, an essential drawback is high cost since the magnetic sensor is expensive.

In view of the above drawbacks, the present invention aims to provide a compound operation input device in which an inexpensive rotary switch is used and in which the height of the device is reduced.

In order to accomplish the above aim, the compound operation input device of the present invention includes a substrate; a first operation body moving operable in a direction substantially orthogonal to the substrate; a second operation body of annular shape, being arranged around the first operation body, tilting operable, and rotating operable in a peripheral direction; a first switching means operated by the movement of the first operation body; a plurality of second switching means operated by the tilt of the second operation body; and a rotary switch that detects the rotation of the second operation body. In such device, the rotary switch includes a contactor attached to the second operation body, and a slide contacting point pattern on which the contactor slides in response to the rotation of the second operation body; and the first and second switching means, and the slide contacting point pattern of the rotary switch are all arranged on a surface of the substrate.

The plurality of second switching means are preferably arranged in an annular form around the first switching means on the substrate, and the slide contacting point pattern of the rotary switch is arranged between the first switching means and the second switching means on the substrate.

The compound operation input device may further include a case for accommodating the substrate. The case preferably includes a substantially circular bottom plate section to mount the substrate thereon and an outer wall section arranged in an upstanding manner along an outer peripheral edge of the bottom plate section. The outer wall section preferably has a plurality of contacting parts on a surface facing the second switching means, the contacting parts being projectingly formed, and contactable with a surface of the second operation body, and the plurality of second switching means and the plurality of contacting parts are alternately arranged in the circumferential direction.

In this case, when load is applied towards the direction of the substrate when rotation operating the second operation body, the distal end of the contacting part closest to the operated portion of the second operation body contacts the surface of the second operation body facing the key top and supports the second operation body. The second operation body is thereby prevented from being tilted to an extent of operating the second switching means. In other words, malfunction of the second switching means in rotating operation is prevented.

Alternatively, if the compound operation input device includes a case for accommodating the substrate, the first switching means may include a pair of first fixed contacting point parts formed on the surface of the substrate, and a first movable contacting point part in contact with one of the pair of first fixed contacting point parts and, when deformed by the abutment of the first operation body, being brought into contact also with the other of the pair of first fixed contacting parts; while each of the plurality of the second switching means includes a pair of second fixed contacting point parts formed on the surface of the substrate, and a second movable contacting point parts in contact with one of the pair of second fixed contacting point parts and, when deformed by the abutment of the second operation body, being brought into contact also with the other of the pair of second fixed contacting parts. In this configuration, the case preferably includes a bottom plate section to mount the substrate thereon and the bottom plate is provided with a plurality of ribs to pass through the substrate and to position the first movable contacting point part of the first switching means and the second movable contacting point parts of the second switching means.

In this case, if the first and second movable contacting point parts of the first and second switching means are respectively set inside the ribs passing through the substrate, the first and second movable contacting point parts will contact one of the pair of the first and second fixed contacting point parts. Thus, positioning and assembly of the first and second movable contacting point parts of the first and second switching means become very easy. Furthermore, the ribs passing through the substrate will ease the positioning of the substrate with respect to the case.

A flexible substrate may be used as the substrate. One surface of the bottom plate section of the case may be performed with insulation processing to be used as the substrate formed with the pair of first and second fixed contacting point parts of the first and second switching means. This has significant merits in that the number of components can be reduced and the height of the device can be reduced since the substrate is unnecessary.

Furthermore, the compound operation input device may have a configuration including an annular key top arranged in a freely tilting manner between the second operation body and the second switching means and arranged with a plurality of projections on the outer peripheral surface. In this case, it is preferable that the case includes an outer wall section arranged in an upstanding manner along the outer peripheral edge of the substantially circular bottom plate section, and that a plurality of notches for guiding the plurality of projections of the key top are formed in the outer wall section.

When the projections of the key top are guided by the notches in the outer wall section of the case, the key top tilts in response to the tilting operation of the second operation body, and the second switching means can be reliably pressed down. Such configuration will prevent the failure to press down the second switching means when the second operation body is tilting operated due to the rotation of the key top, for example.

A concave-convex surface may be provided on a surface of the second operation body facing the key top, and a plate spring that slides on the concave-convex surface in response to the rotation of the second operation body may be arranged on a surface of the key top facing the second operation body. Alternatively, the concave-convex surface may be provided on the surface of the key top facing the second operation body, and the plate spring that slides on the concave-convex surface in response to the rotation of the second operation body may be arranged on a surface of the second operation body facing the key top. In either case, on the surface of the second operation body facing the key top or the surface of the key top facing the second operation body, there may be provided a convex part for forming a clearance to accommodate the plate spring between the second operation body and the key top.

In either of the above two cases, the clearance to accommodate the plate spring is formed between the second operation body and the key top by abutting the convex part against the surface facing the second operation body of the key top or the surface facing the key top of the second operation body. The inexpensive plate spring may slides on the concave-convex surface, and thereby produces the operation feeling.

The compound operation input device may adopt a variable resistor in place of the rotary switch. The variable resistor preferably includes a contactor attached to the second operation body, and a resistor pattern arranged on the surface of the substrate arranged with the first and second switching means and the contactor may slidably contact the resistor pattern in response to the rotation of the second operation body.

According to the compound operation input device of the present invention, the device height is reduced compared to the prior art since the first and second switching means and the slide contacting point pattern of the rotary switch (or a variable resistor) are all arranged on the same surface of the substrate. Furthermore, the invention also enjoys reduced cost since inexpensive rotary switch or variable resistor is used for rotating operation input.

BRIEF DESCRIPTION OF THE DRAWINGS

The invention, together with objects and advantages thereof, may best be understood by reference to the following description of the presently preferred embodiment together with the accompanying drawings in which

FIG. 4(*a*) is a schematic perspective view of a state in which an operating member of the device is detached and shows the device from the upper side;

FIG. 4(*b*) is a schematic perspective view of a state in which an operating member of the device is detached and shows the device from the lower side;

FIG. 5(*a*) is a schematic perspective view of a flexible substrate of the device and shows the substrate from the upper side;

FIG. 5(*b*) is a schematic perspective view of a flexible substrate of the device and shows the substrate from the lower side;

FIG. 7(*a*) is a view showing a key top of the device and is a schematic perspective view seen from the upper surface side;

FIG. 7(*b*) is a view showing a key top of the device and is a schematic perspective view seen from the lower surface side; and FIG. 8(*a*) is a view showing a rotating body of the device and is a schematic perspective view seen from the upper surface side;

FIG. 8(*b*) is a view showing a rotating body of the device and is a schematic perspective view seen from the upper surface side schematic perspective view seen from the lower surface side.

DETAILED DESCRIPTION OF THE PREFERRED EMBODIMENTS

Figure 1:
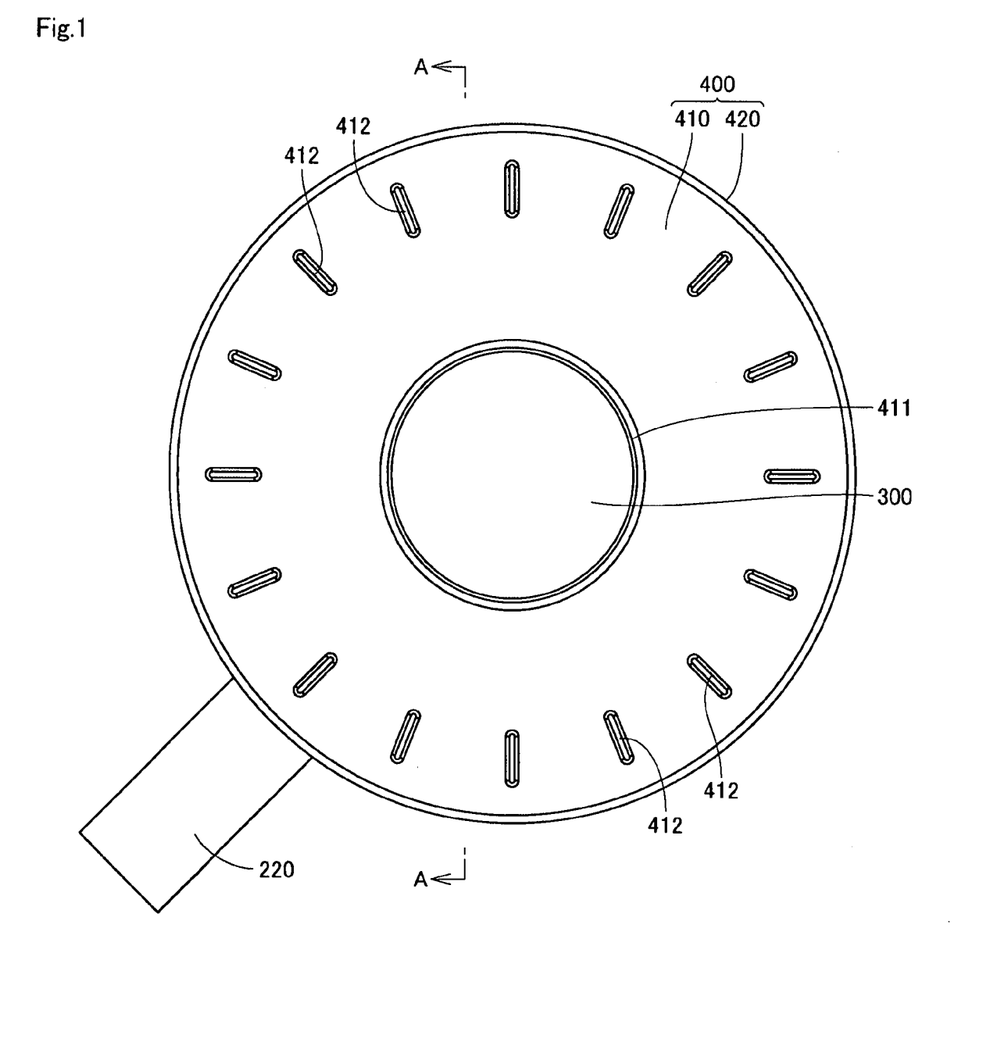
FIG. 1 is a schematic plan view of an input device according to an embodiment of the present invention.
Figure 2:
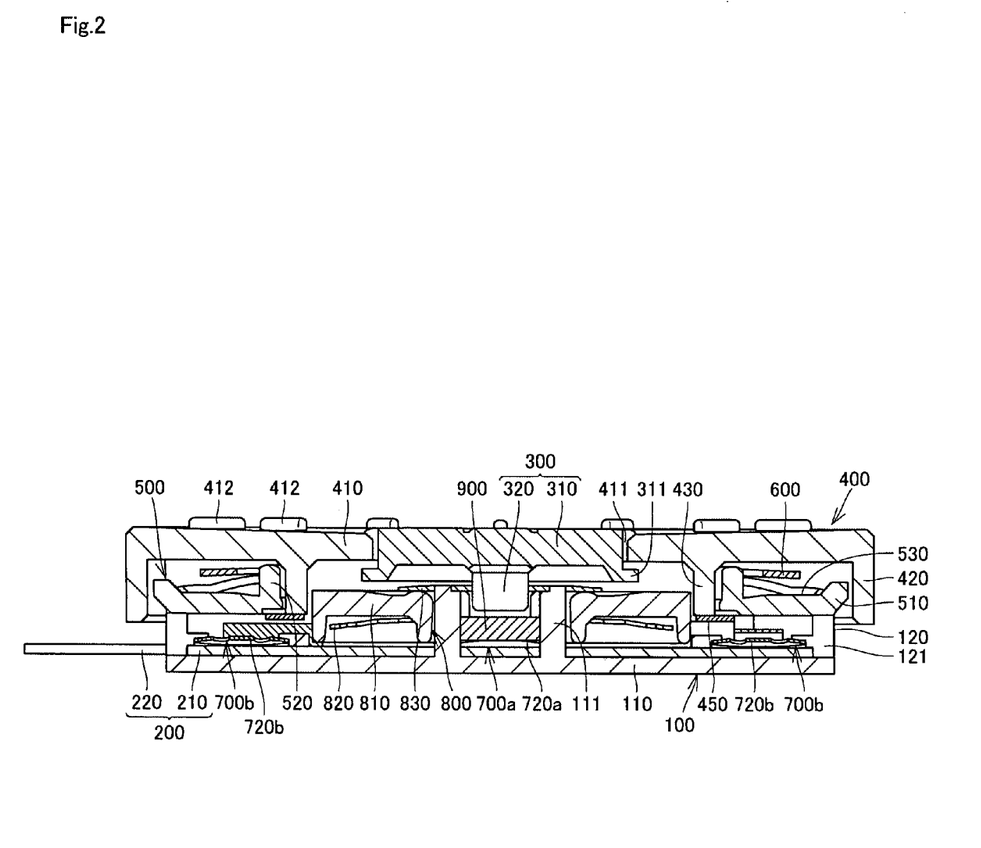
FIG. 2 is a cross sectional view taken along line A-A of FIG. 1 of the device.

A compound operation input device shown in FIGS. 1 and 2 includes a case 100; a flexible substrate 200 mounted on a bottom plate section 110 of the case 100; a first operation body 300 moving operable in a direction orthogonal to the flexible substrate 200; a second operation body 400 tilting operable and rotating operable in the circumferential direction, the second operation body being an annular member arranged at the periphery of the first operation body 300; an annular key top 500 arranged facing the lower surface of the second operation body 400 and tiltable in response to the tilt of the second operation body 400; a plate spring 600 attached to the lower surface of the second operation body 400; a first switching means 700*a* operatable by the movement of the first operation body 300; a plurality of second switching means 700*b* operatable by the tilt of the second operation body 400 and the key top 500; and a rotary switch 800 that detects the rotating direction and the rotating amount of the second operation body 400.

Figure 3:
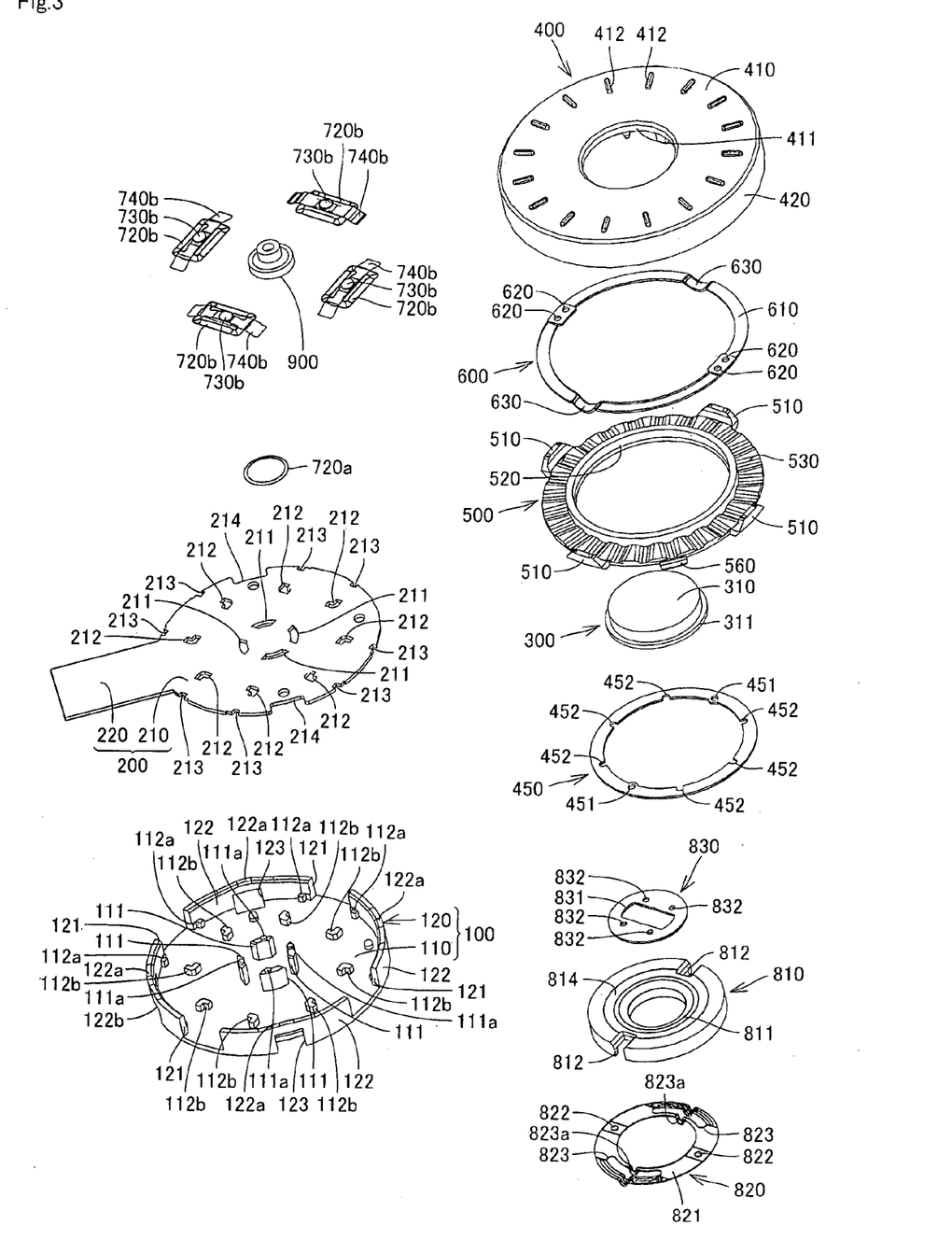
FIG. 3 is a schematic exploded view of the device.
Figure 4:
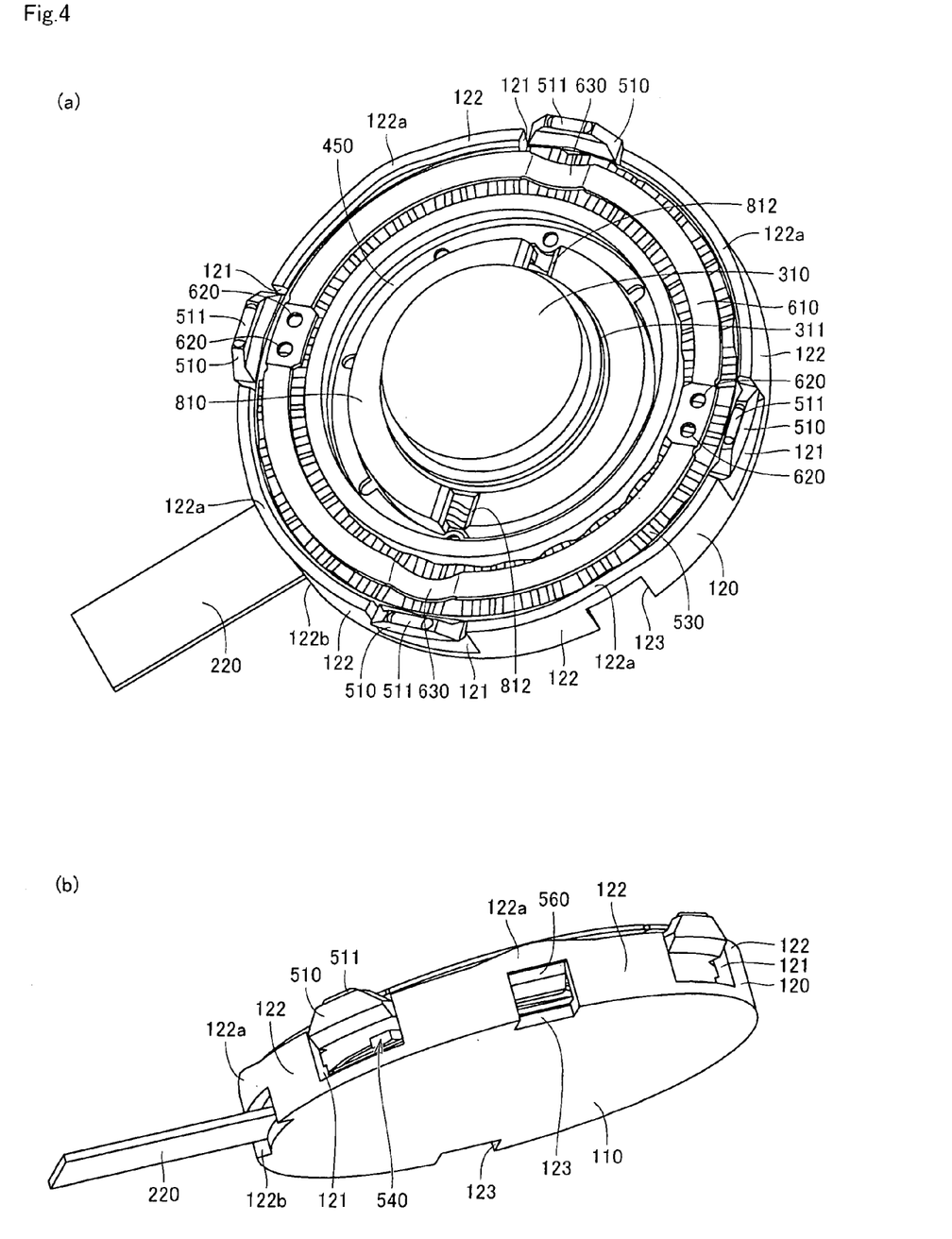

The case 100 is a resin molded article of cup shape including a bottom plate section 110, which is a circular plate shaped body, and an outer wall section 120 arranged in an upstanding manner at the outer peripheral edge of the upper surface of the bottom plate section 110, as shown in FIGS. 2, 3, and 4.

The outer wall section 120 has four rectangular notches 121 formed at an interval of 90°, and four circular arc shaped walls 122 divided by the notches 121. Each wall 122 has a hill shaped contacting part 122a at the central part of the upper surface thereof (i.e., a portion of the wall's surface facing the key top, holizontally offset from and between the second switching means 700b). The top of the contacting part 122a contacts the lower surface of a top plate 410 of the second operation body 400 when the second operation body 400 is pushing moved and tilted as hereinafter described.

At the central part of the lower end of one of the four walls 122, there is provided an opening 122b for guiding an external connecting part 220 of the flexible substrate 200 to the outside of the case 100. Two walls facing each other out of the remaining walls 122 have engaging concave parts 123 for engaging engaging parts 560 of the key top 500. The engaging concave parts 123 extend from the central parts of the lower ends of the two walls 122 to the relevant central parts of the bottom plate section 110.

Four circular arc shaped guide projections 111 are arranged at the center part of the upper surface of the bottom plate section 110, in an annular form with the center of the bottom plate section 110 as the center. A circular cylindrical projection 111a is arranged on the upper surface of each of the guide projections 111 at a position deviated from the center.

Four rib groups are arranged inside the notches 121 of the outer wall section 120 on the upper surface of the bottom plate section 110. Each rib group includes two substantially L-shaped ribs 112a integrally arranged at opposite ends of the inner wall surface of the wall 122 of the outer wall section 120 and two substantially L-shaped ribs 112b arranged so as to face the two ribs 112a.

Figure 5:
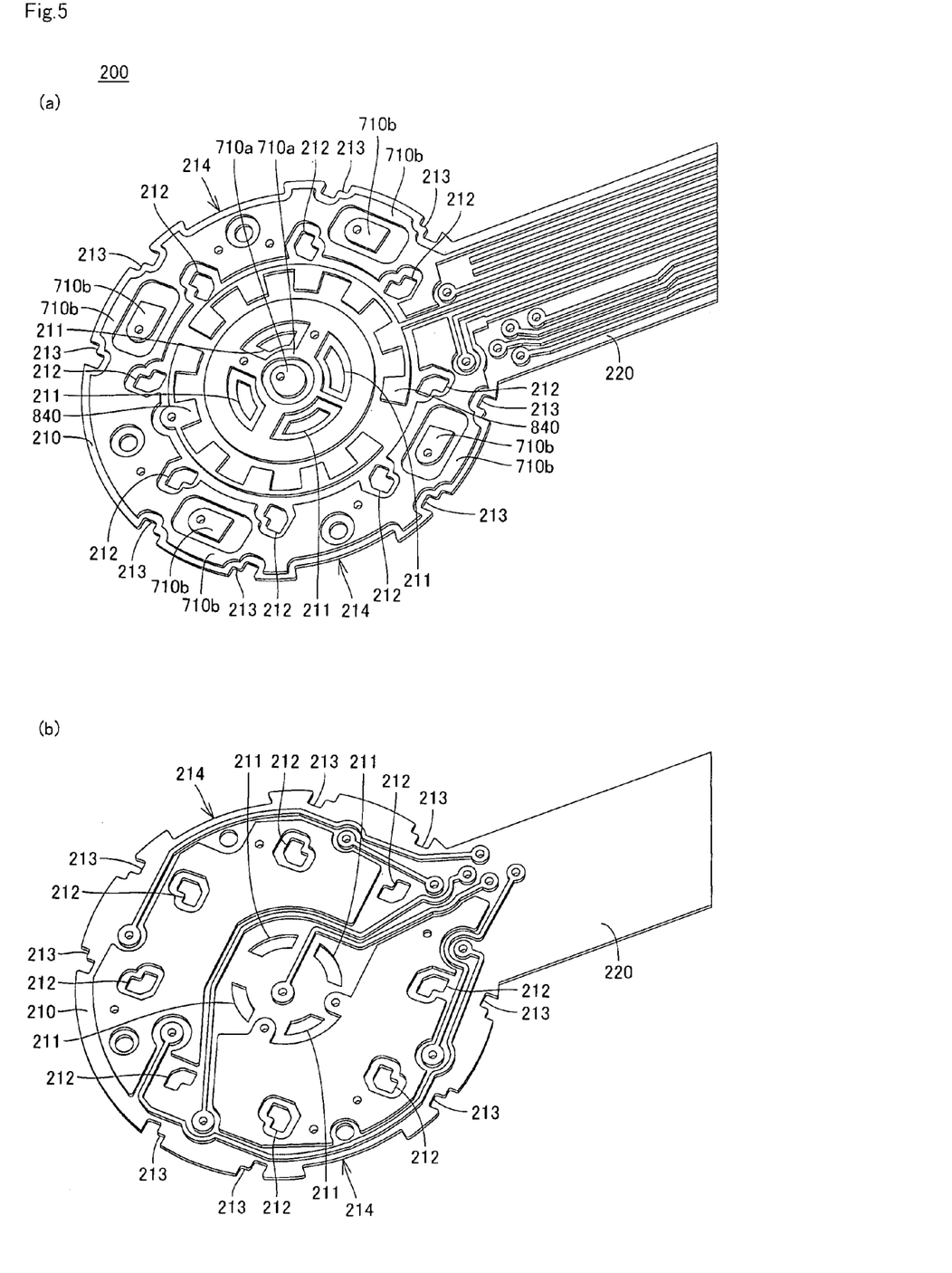

The flexible substrate 200 includes a substantially circular main body 210 and the rectangular external connecting part 220 continuing from the main body 210, as shown in FIGS. 2, 3, and 5.

Four circular arc shaped first holes 211 to receive the guide projections 111 are formed in the central portion of the main body 210, which corresponds to the portion of the case 100 for the four guide projections 111 of the bottom plate section 110.

Substantially L-shaped second holes 212 to receive the ribs 112b are formed in the peripheral edge of the main body 210, which corresponds to the portion of the case 100 for the ribs 112b, while substantially L-shaped first notches 213 to fit the ribs 112a are formed in the peripheral edge of the main body 210, which corresponds to the portion of the case 100 for the ribs 112a.

Furthermore, second notches 214 having a substantially rectangular shape are formed at the peripheral edge of the main body 210, which corresponds to the portion of the case 100 for the engaging concave parts 123 of the case 100, so as to expose the engaging concave parts 123.

The first switching means 700a includes a pair of first fixed contacting point parts 710a formed inside the first holes 211 of the flexible substrate 200, and a dome shaped first snap plate 720a (first movable contacting point part) that is in contact with one of the first fixed contacting point parts 710a, as shown in FIGS. 2, 3, and 5(a).

The first snap plate 720a is of well known type. When it is pushed by the first operation body 300 by way of an elastic body 900 (to be hereinafter described in detail), the center part of the first snap plate 720a flips and contacts the other first fixed contacting point part 710a.

As shown in FIGS. 2, 3, and 5(a), each of the second switching means 700b includes a pair of second fixed contacting point parts 710b arranged between the second holes 212 and the first notches 213 of the flexible substrate 200, a second snap plate 720b (second movable contacting point part) having an arch shape in cross sectional view that is in contact with one of the second fixed contacting point parts 710b, a spacer 730b (such as one made of PORON (registered trademark)) arranged at the top of the second snap plate 720b, and an adhesive tape 740b for attaching the second snap plate 720 to the flexible substrate 200 with the spacer 730b arranged at the top.

The second snap plate 720b is of well known type. When it is pushed by a pushing convex part 540 of the key top 500, so that the center part of the second snap plate 720b flips and contacts the other second fixed contacting point part 710b.

The spacer 730b ensures a predetermined clearance between the second snap plate 720b and the pushing convex part 540 of the key top 500, and prevents the second snap plate 720b from being carelessly pushed down during the rotating operation of the second operation body 400.

The first operation body 300 generally has a substantially inverted convex shape in cross sectional view, and includes a disc shaped operating member 310 and a rectangular column shaped pushing part 320 arranged on the lower surface of the operating member 310, as shown in FIGS. 2, 3, and 4(a).

The operating member 310 has a slightly smaller diameter than an opening 411 of the second operation body 400 so that the operating member 310 may fit concentrically into the opening 411 of the second operation body 400. A flange 311 of convex form is formed along the outer peripheral edge of the lower end of the operating member 310. The flange 311 functions as a retainer of the first operation body 300 by contacting the inner peripheral edge of the opening 411 of the second operation body 400.

The elastic body 900 made of rubber has a substantially convex shape in cross sectional view and is interposed between the pushing part 320 of the first operation body 300 and the first snap plate 720a of the first switching means 700a, as shown in FIGS. 2 and 3. The first operation body 300 may push the first switching means 700a by way of the elastic body 900 (this state is the initial state before the operation of the first operation body 300).

Figure 6:
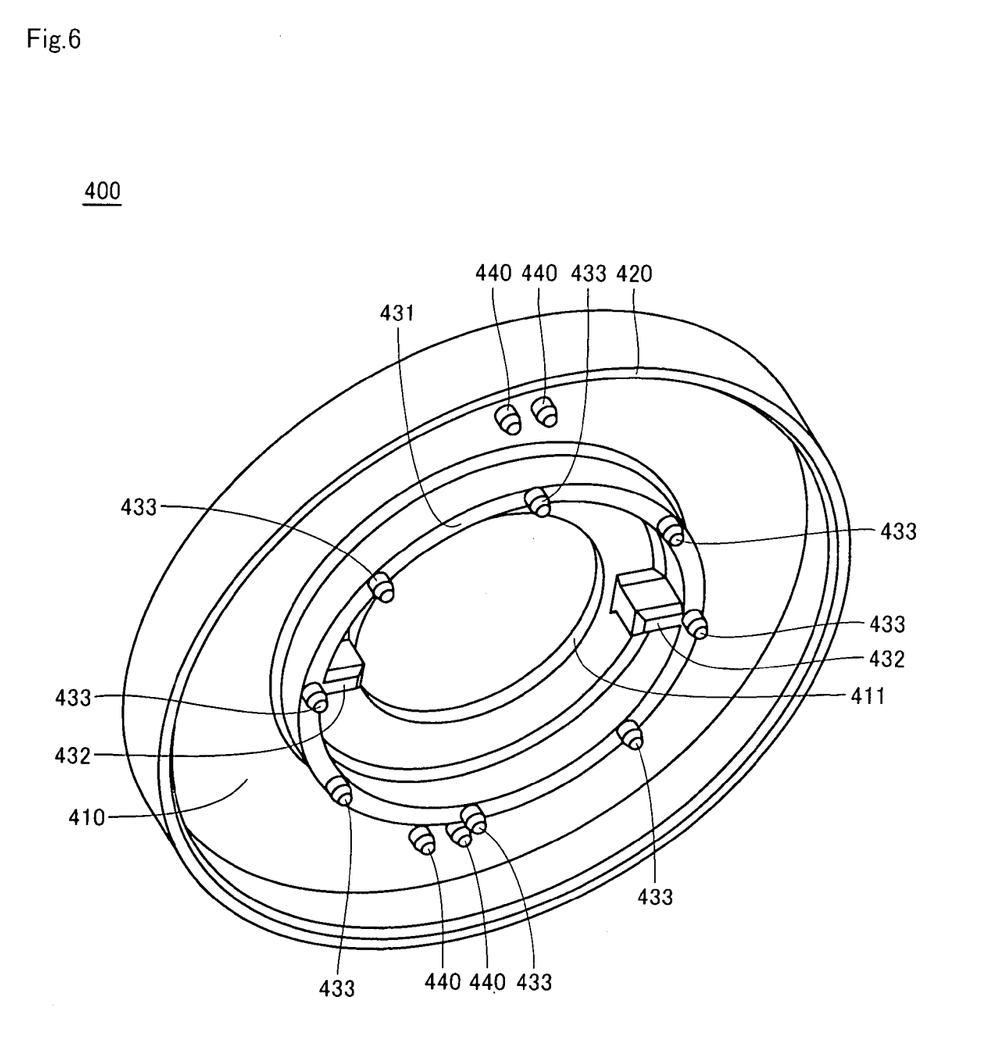
FIG. 6 is a schematic perspective view showing a second operation body of the device from the lower surface side.
Figure 7:
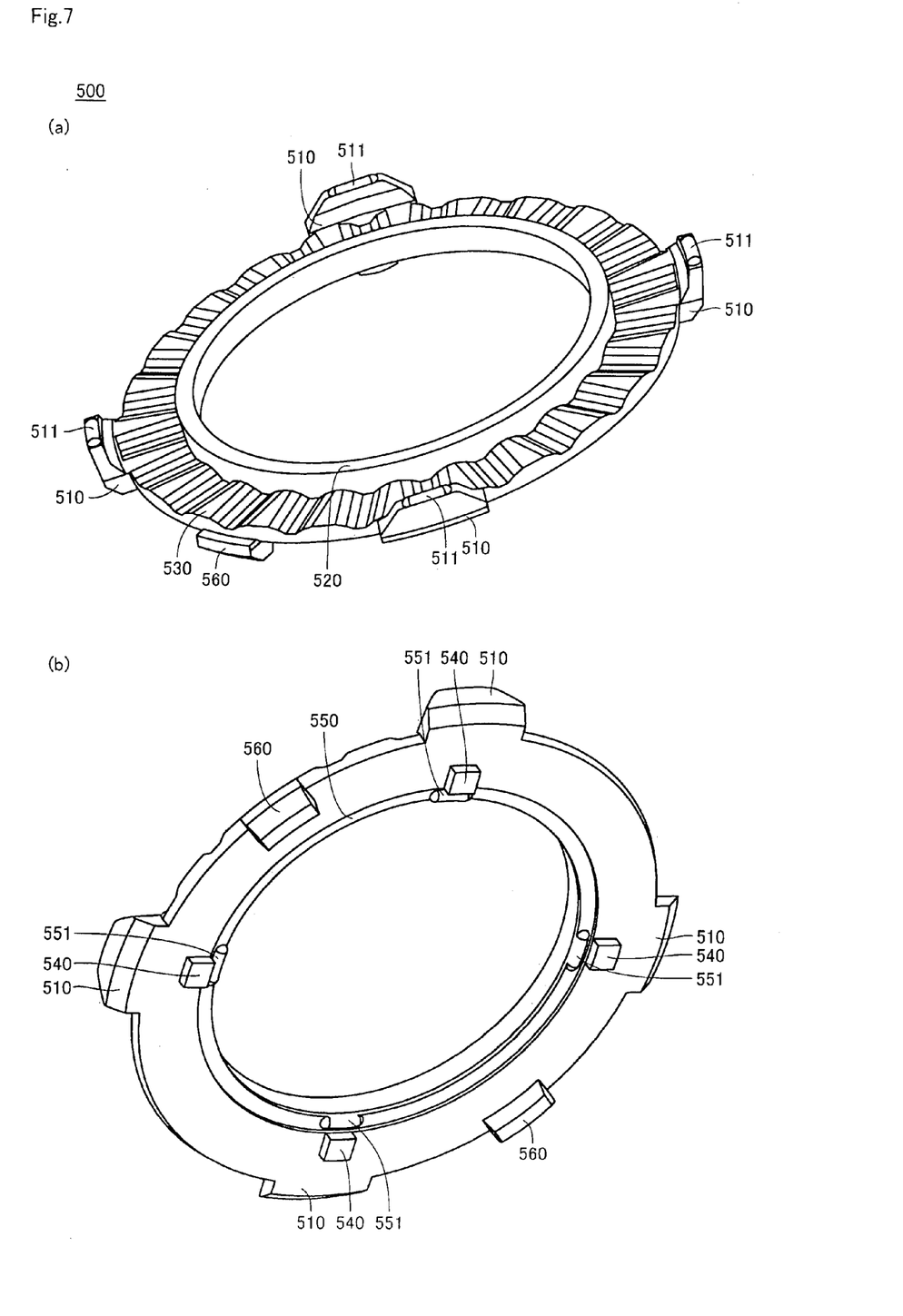

As shown in FIGS. 2, 3, and 6, the second operation body 400 which is generally an annular member having a substantially concave shape in cross sectional view, and includes an annular top plate 410, to be placed over the case 100; an outer wall 420 arranged along the outer peripheral edge of the lower surface of the top plate 410; an inner wall 430 arranged inside the outer wall 420 on the lower surface of the top plate 410; two pairs of attachment convex parts 440 provided between the outer wall 420 and the inner wall 430 on the lower surface of the top plate 410, the two pairs being arranged on the opposite sides of the top plate 410; and a fixed plate 450 attached to the inner wall 430.

The top plate 410 is larger in diameter than the bottom plate section 110 of the case 100, and when the second operation body 400 is placed over the case 100, the outer wall 410 of the second operation body 400 will be positioned outside the outer wall section 120 of the case 100. The circular opening 411 for fitting the first operation body 300 is formed in the central portion of the top plate 410. The diameter of the opening 411 is slightly larger than the diameter of the operating member 310 of the first operation body 300 and smaller than the outer size of the flange 311 of the operating member 310. On the upper surface of the top plate 410, projections 412 are radially formed from the center of the top plate 410 as shown in FIG. 1. These projection 412 helps to resist the slipping of fingers of the user during the operation.

The inner wall 430 includes a ring shaped inner wall main body 431, a pair of rectangular fitting convex parts 432 extending inwards on the inner wall main body 431 so as to face each other, and eight attachment parts 433 arranged at a predetermined interval on the lower surface of the inner wall main body 431.

The fitting convex parts 432 are fitted into fit-in parts 812 of a rotating body 810 of the rotary switch 800. The attachment parts 433 are convex parts having substantially cylindrical column shapes in which the diameters reduce from the middle part towards the distal end, and are inserted into and engaged with attachment holes 451 and attachment concave parts 452 of the fixed plate 450.

As shown in FIGS. 2 and 3, the fixed plate 450 is an annular plate body having a wider width than the lower surface of the inner wall main body 431. Two attachment holes 451 are formed in the opposed positions on the inner edge of the fixed plate 450. In each of the two regions between the two attachment holes 451 on the inner edge of the fixed plate 450, there are further provided three attachment concave parts 452 at a predetermined interval. The attachment holes 451 and the attachment concave parts 452 are to receive the attachment parts 433. The inner edge of the fixed plate 450 is thereby attached to the lower surface of the inner wall main body 431, and the outer edge of the fixed plate 450 is projected outside of the inner wall main body 431.

The attachment convex parts 440 are convex parts of substantially cylindrical column shape in which the diameters reduce from the middle portions towards the distal ends, as shown in FIG. 6.

As shown in FIGS. 2, 3, 4, and 7, the key top 500 is generally an annular plate shaped body to be accommodated between the outer wall section 120 of the case 100 and the inner wall 430 of the second operation body 400. The key top 500 includes four projections 510 arranged at an interval of 90° on the outer periphery; an annular convex part 520 formed along the inner edge of the upper surface; a concave-convex surface 530 formed in the region excluding the convex part 520 of the upper surface; four pushing convex parts 540 arranged on the lower surface at the same interval as the projections 510; a concave part 550 formed along the inner edge of the lower surface; and two engaging parts 560 arranged in the lower surface between the pushing convex parts 540.

The pushing convex parts 540 are convexly formed to have substantially rectangular shapes. The four pushing convex parts 540 are placed on the four spacers 730b on the second snap plates 720b of the second switching means 700b. The key top 500 is thereby accommodated in the case 100 in a horizontal state. The distal end faces of the pushing convex parts 540 are of substantially hill shape. That is, the key top 500 may tilt using the tops of the two pushing convex parts 540 in opposed positions as the supporting points.

The concave part 550 of the key top 500 is arranged to face the outer edge of the fixed plate 450 of the second operation body 400. On the surface of the concave part 550, there are provided four first projections 551 at an interval of 90° as shown in FIG. 7(b). The first projections 551 of substantially elliptical shape are to be placed on the outer edge of the fixed plate 450 of the second operation body 400.

The convex part 520 contacts the lower surface of the top plate 410 of the second operation body 400, thereby creating a space for accommodating the plate spring 600 between itself and the lower surface.

The projections 510 of substantially trapezoidal shape are to be fitted into and guided by the notches 121 of the outer wall section 120 of the case 100. The key top 500 is thus prevented from rotating with the second rotating body 400 and is able to push a second snap plate 720b without the corresponding pushing convex part 540 being displaced. Second projections 511 of substantially elliptical shape are formed at the distal end faces of the projections 510. The height positions of the tops of the second projections 511 and the top surface of the convex part 520 are substantially the same.

The engaging parts 560 are engaged in a freely tilting manner with the engaging concave parts 123 of the case 100, and serve as slip-off preventing parts of the key top 500.

As shown in FIGS. 2, 3, and 4(a), the plate spring 600 includes an annular plate body part 610, pairs of attachment holes 620, and curved parts 630 of downwardly convexed semicircular shape. Each pair of attachment holes 620 and each curved part 630 are alternately formed at an interval of 90° on the plate body part 610.

The attachment holes 620 are holes to receive and be engaged with the attachment convex parts 440 of the second operation body 400. That is, the plate spring 600 can tilt and rotate with the second operation body 400 by being attached to the second operation body 400.

The curved parts 630 slide on the concave-convex surface 530 of the key top 500 by the rotation of the second operation body 400, thereby producing an operation feeling in the rotating operation.

The rotary switch 800, as shown in FIGS. 2 and 3, includes a rotating body 810 rotatable with the second operation body 400, a contacting body 820 to be attached to the rotating body 810, a fixed body 830 for fixing the rotating body 810 to the case 100, and a pair of slide contacting point patterns 840 formed around the first holes 211 of the flexible substrate 200.

Figure 8:
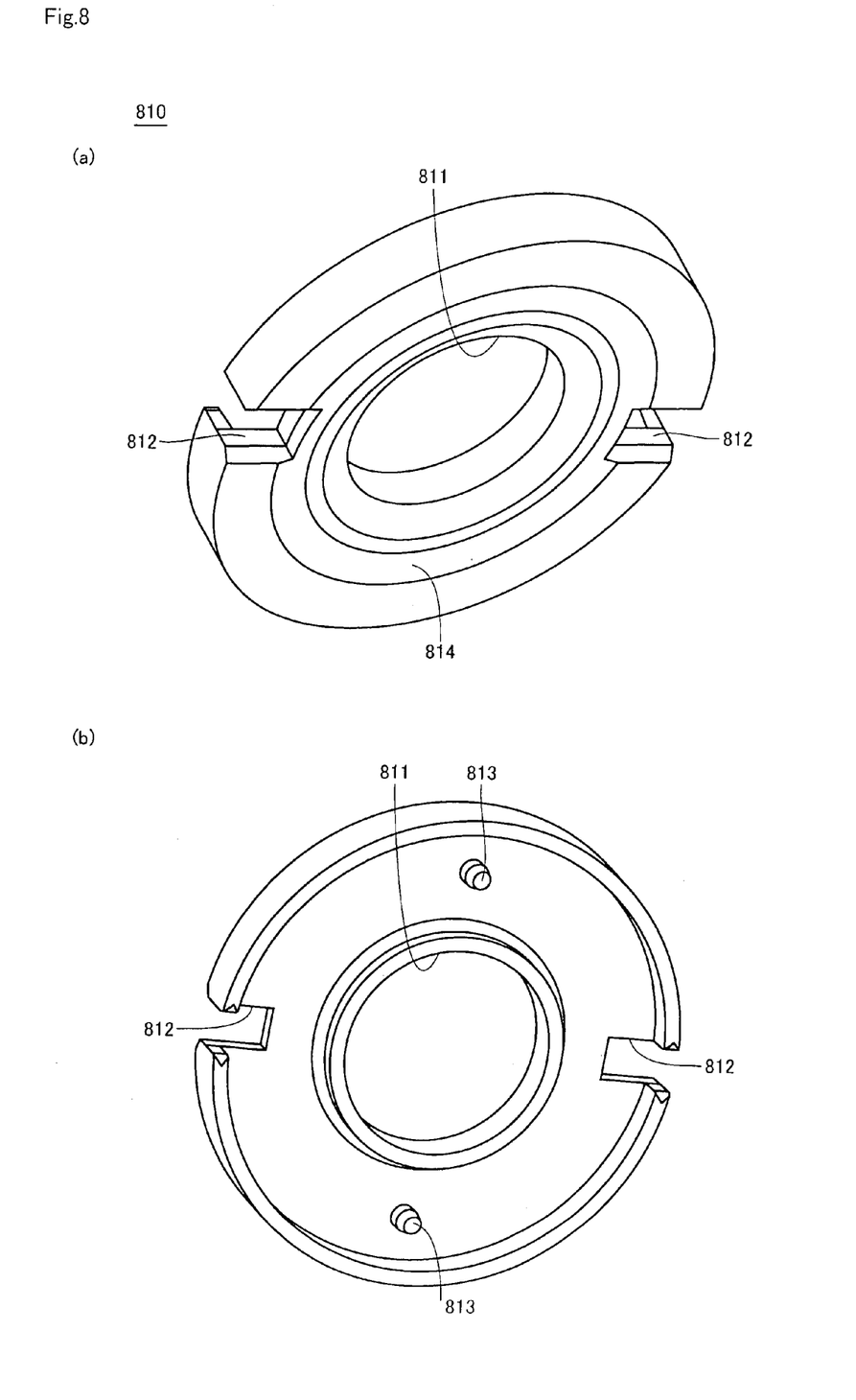

As shown in FIG. 8, the rotating body 810 consists of an annular base plate, an outer wall formed along the outer edge of the base plate, and an inner wall downwardly formed along the inner edge of the base plate. An opening 811 is formed at the center part of the rotating body 810. The opening 811 are to fit four guide projections 111 of the bottom plate section 110 of the case 100 thereinto. In other words, the rotating body 810 rotates with the four guide projections as the supporting point.

A pair of fit-in parts 812 is concavely cut in opposed positions on the outer edge of the base plate and the outer wall of the rotating body 810. The fit-in part 812 are to fit the convex part 432 of the inner wall 430 of the second operation body 400 therein. The rotating body 810 is thereby rotatable with the second operation body 400.

As shown in FIG. 8(b), attachment projections 813 for attaching the contacting body 820 thereto are formed on the lower surface of the rotating body 810. The attachment projections 813 are disposed at the portions shifted by 90° from the pair of fit-in parts 812. The attachment projections 813 are convexly formed to have substantially cylindrical column shapes in which the diameters reduce from the middle parts towards the distal ends. An accommodating concave part 814 for accommodating the fixed body 830 is formed along the inner edge of the upper surface of the rotating body 810, as shown in FIG. 8(a).

As shown in FIGS. 2 and 3, the contacting body 820 includes a base part 821 having a ring shaped flat plate of narrower width than the rotating body 810, two attachment holes 822 formed in the base part 821 at an interval of 180° pitch, and a pair of contacting parts 823 formed on the base part 821 at positions shifted by 90° from the attachment holes 822.

The attachment projections 813 of the rotating body 810 are to receive the attachment hole 822 for engagement. The contacting body 820 is thereby attached to the lower surface of the rotating body 810.

Each of the contacting part 823 is cut into a circular arc shape at two locations, and thus is divided into three. The central part of the contacting part 823 is curved downward, and such curved part becomes a contactor 823a that slides on the slide contacting point pattern 840.

The fixed body 830 is a disc shaped member in which the diameter is set larger than the diameter of the opening 811 of the rotating body 810, and is formed with a rectangular insertion hole 831 at the central part. The pushing part 320 of the first operation body 300 is inserted into the insertion hole 831, thereby preventing the rotation of the first operation body 300.

Four attachment holes 832 are formed outside the insertion hole 831 of the fixed body 830. The attachment holes 832 receive and fit thereinto the projections 111a of the guide projections 111. The fixed body 830 is thereby attached on the upper surfaces of the four guide projections 111, and the outer edge of the fixed body 830 is accommodated in the accommodating concave part 814 of the rotating body 810 attached to the guide projection 111.

The procedures for assembling the compound operation input device having the above configuration will now be described. First, the external connecting part 220 of the flexible substrate is positioned and inserted into the opening 122b of the case 100, and guided to the outside of the case 100. The guide projections 111 on the bottom plate section 110 of the case 100 are then positioned and inserted into the first holes 211 of the main body 210 of the flexible substrate 200, while the ribs 112b and 112a on the bottom plate section 110 of the case 100 are positioned and inserted into the second holes 212 and the first notches 213 of the main body 210 of the flexible substrate 200. The main body 210 of the flexible substrate 200 is thereby guided by the guide projections 111 and the ribs 112a and 112b, and set on the bottom plate section 110 of the case 100.

Subsequently, the first snap plate 720a of the first switching means 700a is inserted inside the four guide projections 111 of the base 100, and set on said one of the fixed connecting point parts 710a of the flexible substrate 200. The elastic body 900 is then inserted inside the four guide projections 111. The elastic body 900 is thereby set on top of the first snap plate 720a.

For the four second switching means 700b, the spacers 730b are respectively attached with the adhesive tapes 740b to the tops of the second snap plates 720b of the switching means 700b. Each second snap plate 720b is then attached inside the ribs 112a and 112b (i.e., the rib group) of the case 100 with the same tape 740b. In this case, the second snap plate 720 is guided by the ribs 112a and 112b, and set on said one of the fixed contacting point parts 710b of the flexible substrate 200.

Thereafter, the four guide projections 111 of the case 100 are fitted into the opening 811 of the rotating body 810 attached with the contacting body 820. The contactors 823a of the contacting body 820 thereby contact the pair of slide contacting point patterns 840.

The fixed body 830 is then attached to the four guide projections 111. The pushing part 320 of the first operation body 300 is positioned and inserted into the insertion hole 831 of the fixed body 830 and inside the four guide projections 111, and set on the elastic body 900.

Thereafter, the plate spring 600 is attached to the second operation body 400. The key top 500 is accommodated between the outer wall 420 and the inner wall 430 of the second operation body 400, and then the fixed plate 450 is attached to the lower surface of the inner wall 430 of the second operation body 400.

The second operation body 400 in such state is placed over the case 100. At this time, the operating member 310 of the first operation body 300 set on the guide projections 111 of the case 100 is positioned and fitted into the opening 411 of the second operation body 400, and the fitting convex parts 432 of the inner wall 430 of the second operation body 400 are positioned and fitted into the fit-in parts 812 of the rotating body 810.

Simultaneously, the projections 510 of the key top 500 are positioned and fitted into the notches 121 of the outer wall section 120 of the case 100. The pushing convex parts 540 of the key top 500 are thereby placed on the respective spacers 730b of the second snap plates 720b on the flexible substrate 200, and the key top 500 is accommodated in a horizontal state between the outer wall section 120 of the case 100 and the inner wall 430 of the second operation body 400.

According to the compound operation input device assembled as above, when the first operation body 300 is pushing operated from the initial state, the first snap plate 720a of the first switching means 700a is pushed by way of the elastic body 900. The first snap plate 720a then flips and contacts the other fixed contacting point part 710a. The first switching means 700a is then turned ON, and the output signal thereof is inputted to electronic equipment (not shown) via the external connecting part 220 of the flexible substrate 200.

Thereafter, when the first operation body 300 is releaed, the first operation body 300 is pushed upward by the restoring force of the first snap plate 720 and the elastic body 900 to return to the initial state.

When the second operation body 400 of the compound operation input device is tilting operated from the horizontal state, the portion on the operation side of the top plate 410 of the second operation body 400 pushes down the corresponding one of the projections 510 and the corresponding portion of the convex part 520 on the operation side of the key top 500. The portion on the non-operation side of the outer edge of the fixed plate 450 of the second operation plate 400 pushes up the first projection 551 on the non-operation side of the inner edge of the key top 500. The second operation body 400 and the key top 500 thereby tilt. The projection 510 of the key top 500 is guided by the corresponding notch 121 in the outer wall section 120 of the case 100 and tilted.

The corresponding one of the pushing convex parts 540 of the key top 500 then pushes the corresponding one of the second snap plates 720b of the second switching means 700b. The second snap plate 720b then flips and contacts the other fixed contacting point part 710b. The second switching means 700b is then turned ON and the output signal thereof is input to electronic equipment (not shown) via the external connecting part 220 of the flexible substrate 200.

When the second operation body 400 is released, the key top 500 and the second operation body 400 are pushed upward by the restoring force of the second snap plate 720b to return to the horizontal state.

When the second operation body 400 of the compound operation input device is rotating operated, the fitting convex parts 432 of the second operation body 400 push the fit-in parts 812 of the rotating body 810 and rotate the rotating body 810. The pair of contactors 823a of the contacting parts 823 of the contacting body 820 attached to the rotating body 810 then slide on the pair of slide contacting point patterns 840, and the output signal thereof is inputted to electronic equipment (not shown) via the external connecting part 220 of the flexible substrate 200 as a signal indicating the rotating direction and the rotating angle of the second operation body 400.

If load is applied in the downward direction during the rotating operation of the second operation body 400 (i.e., when the second operation body 400 is rotating operated in a diagonally downward direction), the lower surface of the top plate 410 of the second operation body 400 contacts the contacting part 122a closest to the operated portion of the second operation body 400 of the wall 122 of the case 100, and is supported by the same. The second operation body 400 is thereby prevented from being tilted to an extent of operating any second switching means 700b.

Also when the second operation body 400 is pushing operated at a portion below which no second switching means 700b is disposed, the lower surface of the top plate 410 of the second operation body 400 contacts the contacting part 122a closest to the operated portion of the second operation body 400 of the wall 122 of the case 100, and is supported by the same. The second operation body 400 is thereby prevented from being tilted to an extent of operating any second switching means 700b.

According to such compound operation input device, the height of the device can be reduced because the first and second switching means 700a, 700b and the slide contacting point patterns 840 of the rotary switch 800 are all arranged on the same surface of the flexible substrate 200. Furthermore, the compound operation input device can be manufactured at low cost because the device is configured using well-known first and second switching means 700a, 700b and the rotary switch 800.

The guide projections 111 and the ribs 112a, 112b passed through the flexible substrate 200 also help to position the first and second snap plates 720a, 720b of the first and second switching means 700a, 700b. Such configuration can reduce the height of the device compared to a device with the guide projection 111 and the ribs 112a, 112b provided separately for positioning the snap plates. Moreover, the manufacturing cost can be reduced due to the easy positioning of the first and second snap plates 720a, 720b which facilitates the assembly of the snap plates.

Furthermore, when the second operation body 400 is rotating operated in a diagonally downward direction or pushing operated at a portion below which no second switching means 700b is disposed, the hill shaped contacting part 122a formed on the wall 122 of the outer wall section 120 of the case 100 abuts the second operation body 400 and supports the same. In such configuration, said rotating or pushing operations will not cause the second operation body 400 to tilt or the second switching means 700b to malfunction.

Any design change may be made to the compound operation input device as long as the device includes a substrate; a first operation body moving operable in a direction substantially orthogonal to the substrate; a second operation body of annular shape, being arranged around the first operation body, tilting operable, and rotating operable in a peripheral direction; a first switching means operated by the movement of the first operation body; a plurality of second switching means operated by the tilt of the second operation body; and a rotary switch that detects the rotation of the second operation body; wherein the rotary switch includes a contactor attached to the second operation body, and a slide contacting point pattern on which the contactor slides in response to the rotation of the second operation body; and the first and second switching means, and the slide contacting point pattern of the rotary switch are all arranged on a surface of the substrate. Possible design changes will be described in detail below.

The case 100 may be of any type as long as it can accommodate the above elements. Thus, it is optional whether or not to provide the outer wall section 120 of the case 100 with the notches 121, the walls 122, and/or the contacting parts 122a. It is also optional whether or not to arrange the guide projections 111 and the ribs 112a, 112b at the bottom plate section 110 of the case 100.

Although the contacting parts 122a are recited above as having substantially hill shapes, they only need to be projectingly shapef and may be design changed to any shape. Each contacting parts 122a may be arranged at any portion on the upper surface of the outer wall section 120 as long as such portion is between two of the second switching means 700b. For instance, the contacting parts 122a may be arranged at positions shifted from the central parts of the upper surfaces of the walls 122. The contacting parts 122a are applicable to an input device capable of performing only tilting and rotating operations (i.e., input device in which the first operation body 300 and the first switching means 700a are omitted).

The flexible substrate 200 may be replace with a printed substrate or another kind of substrate. Alternatively, a surface of the bottom plate section 110 of the case 100 may be subjected to insulation process, and the fixed contacting point parts 710a, 710b of the first and second switching means 700a, 700b may be formed on such bottom plate section 110. In this case, the omission of a substrate will lead to a reduced number of components and lead to a reduced height of the device by the thickness of the substrate.

The first operation body 300 may be of any shape if it can push down the first switching means 700a and operate the first switching means 700b. Although it is described that the first switching means 700b is pushed by way of the elastic body 900, the elastic body 900 obviously can be omitted.

The second operation body 400 may be of any shape as long as it is an annular member arranged around the first operation body 300 and tilting operable and rotating operable in the peripheral direction. The second operation body 400 can also be configured so as to directly push down the second switching means 700b without through the key top 500.

The first and second switching means 700a, 700b were described above to include the first and second snap plates 720a, 720b, but they are not limited thereto. For instance, conductive rubber may be used for the elastic body 900 or a movable contacting point part may be formed at the distal end face of the elastic body 900 to contact the pair of fixed contacting point parts on the flexible substrate 200. Obviously, a movable contacting point part may be formed at the distal end face of the first operation body 400 when the elastic body 900 is omitted.

The plate spring 600 simply needs to be slidable on the concave-convex surface 530 of the key top 500, and may be of any shape. The plate spring 600 may be attached to the key top 500 and the convex-concave surface may be formed on the lower surface of the top plate 410 of the second operation body 400. Similarly, the convex part 520 of the key top 500 may be formed on the top plate 410 of the second operation body 400. The plate spring 600 and the concave-convex surface 530 may be omitted if the operation feeling does not need to be produced in the rotating operation of the second operation body 400.

The rotary switch 800 may be of any type as long it has a contactor and a slide contacting point pattern on which the contactor slides. Therefore, the rotating body 810, the fixed body 830, and the like may be omitted, and in this case, the contactor can be directly attached to the second operation body 400. The number and shape of the slide contacting point patterns are not limited to those as described in the embodiment.

The compound operation input device may use a variable resistor in place of the rotary switch 800. In this case, a resistor pattern should be formed on the flexible substrate 200 instead of the slide contacting point pattern 840 of the rotary switch 800.

It should be apparent to those skilled in the art that the present invention may be embodied in many other specific forms without departing from the spirit or scope of the invention. Therefore, the present invention is not to be limited to the details given herein, but may be modified within the scope and equivalence of the appended claims.

What is claimed is:

1. A compound operation input device comprising:
    a substrate;
    a first operation body moving operable in a direction substantially orthogonal to the substrate;
    a second operation body of annular shape, being arranged around the first operation body, tilting operable, and rotating operable in a peripheral direction;
    a first switching means operated by the movement of the first operation body;
    a plurality of second switching means operated by the tilt of the second operation body; and
    a rotary switch that detects the rotation of the second operation body; wherein
    the rotary switch includes a contactor attached to the second operation body, and a slide contacting point pattern on which the contactor slides in response to the rotation of the second operation body; and
    the first and second switching means, and the slide contacting point pattern of the rotary switch are all arranged on a surface of the substrate.

2. The compound operation input device according to claim 1, wherein
    the plurality of second switching means are arranged in an annular form around the first switching means on the substrate, and
    the slide contacting point pattern of the rotary switch is arranged between the first switching means and the second switching means on the substrate.

3. The compound operation input device according to claim 2, further comprising a case for accommodating the substrate; wherein
    the case includes a substantially circular bottom plate section to mount the substrate thereon and an outer wall section arranged in an upstanding manner along an outer peripheral edge of the bottom plate section,
    the outer wall section has a plurality of contacting parts on a surface facing the second switching means, the contacting parts being projectingly formed and contactable with a surface of the second operation body, and
    the plurality of second switching means and the plurality of contacting parts are alternately arranged in a circumferential direction.

4. The compound operation input device according to claim 1, further comprising a case for accommodating the substrate; wherein
    the first switching means includes a pair of first fixed contacting point parts formed on the surface of the substrate, and a first movable contacting point part in contact with one of the pair of first fixed contacting point parts and, when deformed by the abutment of the first operation body, being brought into contact also with the other of the pair of first fixed contacting parts;
    each of the plurality of the second switching means includes a pair of second fixed contacting point parts formed on the surface of the substrate, and a second movable contacting point part in contact with one of the pair of second fixed contacting point parts and, when deformed by the abutment of the second operation body, being brought into contact also with the other of the pair of second fixed contacting parts,
    the case includes a bottom plate section to mount the substrate thereon and
    the bottom plate is provided with a plurality of ribs to pass through the substrate and to position the first movable contacting point part of the first switching means and the second movable contacting point parts of the second switching means.

5. The compound operation input device according to claim 4, wherein the substrate is a flexible substrate.

6. The compound operation input device according to claim 4, wherein the bottom plate section of the case has one surface insulating processed to become the substrate formed with the pair of first and second fixed contacting point parts of the first and second switching means.

7. The compound operation input device according to claim 4, further comprising an annular key top arranged in a freely tilting manner between the second operation body and the second switching means and arranged with a plurality of projections on a outer peripheral surface; wherein
    the case includes an outer wall section arranged in an upstanding manner along an outer peripheral edge of the bottom plate section, the bottom plate section being substantially circular, and
    the outer wall section has a plurality of notches for guiding the plurality of projections of the key top.

8. The compound operation input device according to claim 7, wherein a concave-convex surface is provided on a surface of the key top facing the second operation body, and a plate spring that slides on the concave-convex surface in response to the rotation of the second operation body is arranged on a surface of the second operation body facing the key top; and
    a convex part for forming a clearance to accommodate the plate spring between the second operation body and the key top is provided on the surface of the second operation body facing the key top or the surface of the key top facing the second operation body.

9. The compound operation input device according to claim 7, wherein a concave-convex surface is provided on a surface of the second operation body facing the key top, and a plate spring that slides on the concave-convex surface in response to the rotation of the second operation body is arranged on a surface of the key top facing the second operation body; and
    a convex part for forming a clearance to accommodate the plate spring between the second operation body and the key top is provided on the surface of the second operation body facing the key top or the surface of the key top facing the second operation body.

10. The compound operation input device according to claim 1, comprising a variable resistor in place of the rotary switch,
    wherein the variable resistor comprises:
    a contactor attached to the second operation body, and
    a resistor pattern arranged on the surface of the substrate arranged with the first and second switching means, the contactor is slidably contactable with the resistor pattern in response to the rotation of the second operation body.

* * * * *